(12) United States Patent
Ma et al.

(10) Patent No.: US 11,254,071 B2
(45) Date of Patent: Feb. 22, 2022

(54) FLEXIBLE MOLDING PROCESS AND SYSTEM FOR MAGNETIC POLE PROTECTIVE LAYER

(71) Applicant: BEIJING GOLDWIND SCIENCE & CREATION WINDPOWER EQUIPMENT CO., LTD., Beijing (CN)

(72) Inventors: Shengjun Ma, Beijing (CN); Wanshun Ma, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 472 days.

(21) Appl. No.: 16/083,496

(22) PCT Filed: Sep. 19, 2017

(86) PCT No.: PCT/CN2017/102224
§ 371 (c)(1),
(2) Date: Sep. 8, 2018

(87) PCT Pub. No.: WO2018/076963
PCT Pub. Date: May 3, 2018

(65) Prior Publication Data
US 2019/0070798 A1   Mar. 7, 2019

(30) Foreign Application Priority Data

Oct. 31, 2016   (CN) .......................... 201610971861.3

(51) Int. Cl.
*B29C 70/36*   (2006.01)
*B29C 70/54*   (2006.01)
(Continued)

(52) U.S. Cl.
CPC .............. *B29C 70/36* (2013.01); *B29C 70/54* (2013.01); *H02K 15/03* (2013.01); *H02K 15/12* (2013.01);
(Continued)

(58) Field of Classification Search
None
See application file for complete search history.

(56) References Cited

U.S. PATENT DOCUMENTS 4,577,078 A * 3/1986 Noda ..................... B29B 13/022
                                                                219/696
5,194,190 A * 3/1993 Kim ....................... B29C 35/12
                                                                264/258
(Continued)

FOREIGN PATENT DOCUMENTS

CN   102555234 A   7/2012
CN   104325657 A   2/2015
(Continued)

OTHER PUBLICATIONS

Machine English Translation of JP-2000167457-A, Retrieved Sep. 1, 2020 (Year: 2000).*
(Continued)

*Primary Examiner* — Francisco W Tschen
*Assistant Examiner* — Adrianna N Konves
(74) *Attorney, Agent, or Firm* — Bayes PLLC

(57) ABSTRACT

A flexible molding process and system for a magnetic pole protective layer. The molding process is as follows: assembling magnet steels at respective positions on a side wall surface of a magnetic yoke, laying a reinforcing material and a vacuum bag in the listed sequence on the magnet steel and the side wall surface of the magnetic yoke, wherein the vacuum bag, the magnet steels and the side wall surface of the magnetic yoke form a sealed system; performing an
(Continued)

impregnation process, including vacuumizing the sealed system to allow the impregnation liquid to be injected into the sealed system, to achieve infiltration and impregnation; heating the sealed system and/or emitting ultrasonic waves to the sealed system while performing the impregnation process; and performing a curing process after the impregnation process, wherein the impregnation liquid and the reinforcing material are cured to form a protective layer.

20 Claims, 9 Drawing Sheets

(51) Int. Cl.
  *H02K 15/03* (2006.01)
  *H02K 15/12* (2006.01)
  *B29L 31/08* (2006.01)
  *B29L 31/00* (2006.01)

(52) U.S. Cl.
  CPC ... *B29L 2031/08* (2013.01); *B29L 2031/7498* (2013.01)

(56) References Cited

U.S. PATENT DOCUMENTS

| | | | |
|---|---|---|---|
| 2006/0097428 A1 | 5/2006 | Sugiura et al. | |
| 2009/0267436 A1 | 10/2009 | Stiesdal | |
| 2014/0000460 A1* | 1/2014 | Buttiker | B06B 3/04 96/175 |
| 2017/0252985 A1* | 9/2017 | Wang | H02K 15/12 |

FOREIGN PATENT DOCUMENTS

| | | | |
|---|---|---|---|
| CN | 104449784 A | | 3/2015 |
| CN | 105346101 A | | 2/2016 |
| CN | 106469964 A | | 3/2017 |
| CN | 106515043 A | | 3/2017 |
| EP | 2113986 A1 | | 4/2009 |
| GB | WO1993012629 A1 | * | 6/1993 |
| JP | 2000167457 A | * | 6/2000 |
| JP | 2002316033 A | * | 10/2002 |
| KR | 20000046419 A | * | 7/2000 |
| RU | 2361349 C1 | * | 7/2009 |

OTHER PUBLICATIONS

Machine English translation of JP-2002316033-A, Accessed Jan. 28, 2021 (Year: 2002).*
P.K. Mallick, Composites Science and Engineering, Materials, Design and Manufacturing for Lightweight Vehicles, Woodhead Publishing, 2010, pp. 208-231, (https://www.sciencedirect.com/science/article/pii/B9781845694630500067), Accessed Jul. 19, 2021 (Year: 2010).*
Machine English translation of CN104325657, Accessed Jul. 19, 2021 (Year: 2015).*
Machine English translation of RU2361349, Accessed Dec. 9, 2021 (Year: 2009).*
Machine English translation of KR20000046419, Accessed Dec. 9, 2021 (Year: 2000).*
First Official action issued in corresponding Australian Application No. 2017350567, dated Jun. 19, 2019, 4 pages.
Anonymous, ""Entgasung"—Versionsunterchied—Wikipedia", Aug. 24, 2016, 7 pages.
Supplemental European Search Report issued in corresponding European Application No. EP 17 86 4714, dated Jun. 3, 2019, 12 pages.
International Search Report and Written Opinion in corresponding PCT Application No. PCT/CN2017/102224, dated Dec. 20, 2017, 15 pages.

* cited by examiner

_US 11,254,071 B2_

FLEXIBLE MOLDING PROCESS AND SYSTEM FOR MAGNETIC POLE PROTECTIVE LAYER

This application is a national phase of International Application No. PCT/CN2017/102224, titled "FLEXIBLE MOLDING PROCESS AND SYSTEM FOR MAGNETIC POLE PROTECTIVE LAYER", filed on Sep. 19, 2017, which claims the benefit of priority to Chinese patent application No. 201610971861.3 titled "FLEXIBLE MOLDING PROCESS AND SYSTEM FOR MAGNETIC POLE PROTECTIVE LAYER", filed with the Chinese State Intellectual Property Office on Oct. 31, 2016, the entire disclosures thereof are incorporated herein by reference.

FIELD

This application relates to the technical field of electric motors, and in particular to a flexible molding process and a flexible molding system for a magnetic pole protective layer.

BACKGROUND

Reference is made to FIGS. 1-1 and 1-2. FIG. 1-1 is a schematic view of a shaping system for a protective layer for a magnetic pole of a permanent magnet motor; and FIG. 1-2 is a schematic view showing details at a magnet steel in FIG. 1-1.

In FIG. 1, a magnet steel 16 is provided on an inner wall of a magnetic yoke 15 of an outer rotor. The magnet steel 16 is pressed tightly against the magnetic yoke 15 by a pressing strip and fastened by a bolt. In addition, a protective layer 142 is further formed on a surface of the magnet steel 16 by adhesive injection. The specific procedure is described as follows.

Firstly, the surface of the magnet steel 16 is covered by a reinforcing material 142 (for example, a fiberglass cloth), a demoulding cloth 143 and a flow guiding net 141 in the listed sequence, and then a lightweight and flexible vacuum bag 17 is used for closing and covering the above components. Thus, the vacuum bag 17, the magnet steel 16, the pressing strip, and the inner wall of the magnetic yoke 15 form a sealed system. A sealing strip 19 is provided between the vacuum bag 17 and the inner wall of the magnetic yoke 15 for sealing.

Then, the sealed system is vacuumized by means of a vacuum pump 18 to compact the reinforcing material 142, to generate a drive pressure gradient required for impregnating liquid (e.g., resin, adhesive, and etc.). After the vacuum bag 17 is sealed, an adhesive injection port 171 and a discharge port 172 are formed on the vacuum bag 17. The resin is stored in a resin system tank 12. The resin enters the sealed system via the adhesive injection port 171 from an input pipeline 131 under the action of the vacuum pump 18. A small amount of the resin may enter an output pipeline 132 via the discharge port 172 and then enters a resin collector 11. A vacuum gauge 111 is provided at the position of the resin collector 11. The vacuum pump 18 is provided with a drive motor 182 and a regulating valve 181.

With a flexible molding process improved by means of the reinforcing material 142, the resin fills a gap between the magnet steel 16 and the pressing strip for fixing the magnet steel 16, and a gap between the magnet steel 16 and the inner wall of the magnetic yoke 15, and covers the magnet steel 16 and the pressing strip thereof. After the reinforcing material 142 is cured, the demoulding cloth 143 is removed, thus, a protective layer for filling and fixing the entire magnetic pole is formed.

When the liquid is impregnated in the above manner, the rotor is vertically arranged. After the impregnation and curing, there are still some "cavity", i.e., holes qp, in a lower one-third region of the inner wall of the magnetic yoke 14 as viewed from a front side of the rotor. Although the results may be different when using the glass fiber cloth having different densities, the holes qp still exist. As shown in FIG. 2, FIG. 2 is a schematic view showing positions of the bubbles in the magnetic pole protective layer.

The holes are formed after curing, which may adversely affect the performance and the service life of the protective layer. Therefore, it is urgent to improve the current adhesive injection process, so as to reduce the holes in the cured protective layer.

SUMMARY

In order to address the above technical issues, a flexible molding process and a flexible molding system for a magnetic pole protective layer are provided according to the present application, which may reduce holes in the protective layer and improve the performance of a magnetic pole component.

A flexible molding process for a magnetic pole protective layer is provided according to the present application, which includes:

assembling magnet steels at respective positions on a side wall surface of a magnetic yoke, laying a reinforcing material and a vacuum bag in the listed sequence on the magnet steel and the side wall surface of the magnetic yoke, wherein the vacuum bag, the magnet steels and the side wall surface of the magnetic yoke form a sealed system:

performing an impregnation process, including vacuumizing the sealed system to allow the impregnation liquid to be injected into the sealed system, to achieve infiltration and impregnation;

heating the sealed system and/or emitting ultrasonic waves to the sealed system while performing the impregnation process; and performing a curing process after the impregnation process, wherein the impregnation liquid and the reinforcing material are cured to form a protective layer.

A flexible molding process for a magnetic pole protective layer is provided according to the present application, which includes:

assembling magnet steels at respective positions on a side wall surface of a magnetic yoke, laying a reinforcing material and a vacuum bag in the listed sequence on the magnet steels and the side wall surface of the magnetic yoke, wherein the vacuum bag, the magnet steels and the side wall surface of the magnetic yoke form a sealed system; and performing a desorption process, an impregnation process and a curing process in the listed sequence to the sealed system, to form a protective layer; wherein, heating the sealed system while performing at least one of the three processes; and emitting ultrasonic waves to the sealed system while performing at least one of the desorption process and the impregnation process.

A flexible molding system for a magnetic pole protective layer is further provided according to the present application, which includes a magnetic yoke. Magnet steels are mounted at respective positions on a side wall surface of the magnetic yoke, a reinforcing material and a vacuum bag are laid in the listed sequence on the side wall surface of the magnet yoke and the magnetic steel, and the vacuum bag, the side wall surface of the magnetic yoke, and the magnet steels form a sealed system. The flexible molding system for the magnetic pole protective layer further includes an ultrasonic wave emitting device and/or a heating device, the ultrasonic wave emitting device is configured to emit ultrasonic waves to the sealed system while an impregnation liquid is injected into the sealed system to infiltrate and impregnate, and the heating device is configured to heat the sealed system while an impregnation liquid is injected into the sealed system to infiltrate and impregnate.

With the flexible molding system and the flexible molding process for the magnetic pole protective layer according to the present application, in the step of impregnation process, heating treatment is performed and/or ultrasonic waves are emitted. In heating, solid is heated, thus the contact angle of the impregnation liquid when being injected can be reduced, which facilitates impregnation and infiltration of liquid. In emitting ultrasonic waves, mechanical waves facilitate filling the liquid into all of the gaps, to improve the effects of liquid impregnation and infiltration, to thereby reducing bubbles, and allowing the positions of holes in the protective layer finally formed to be reduced.

Heating in the desorption process can reduce the adsorption amount of gas, thereby reducing the bubbles. The excitation and oscillation effects of the mechanical waves of the ultrasonic waves also facilitate escaping of the bubbles in the sealed system to achieve desorption, so as to reduce the positions of holes possibly formed in the protective layer. Heating in curing process can facilitate reaction, gelation and curing of the curing agent and the resin, thus ensuring the curing effect, and also reducing the number of holes finally formed to some extent.

BRIEF DESCRIPTION OF THE DRAWINGS

FIG. 1-2 is a schematic view showing details at a magnet steel in FIG. 1-1;

FIG. 2 is a schematic view showing positions of bubbles in the magnetic pole protective layer;

EXPLANATION OF REFERENCE NUMERALS IN FIGS. 1-1 TO 2

Figure 1:
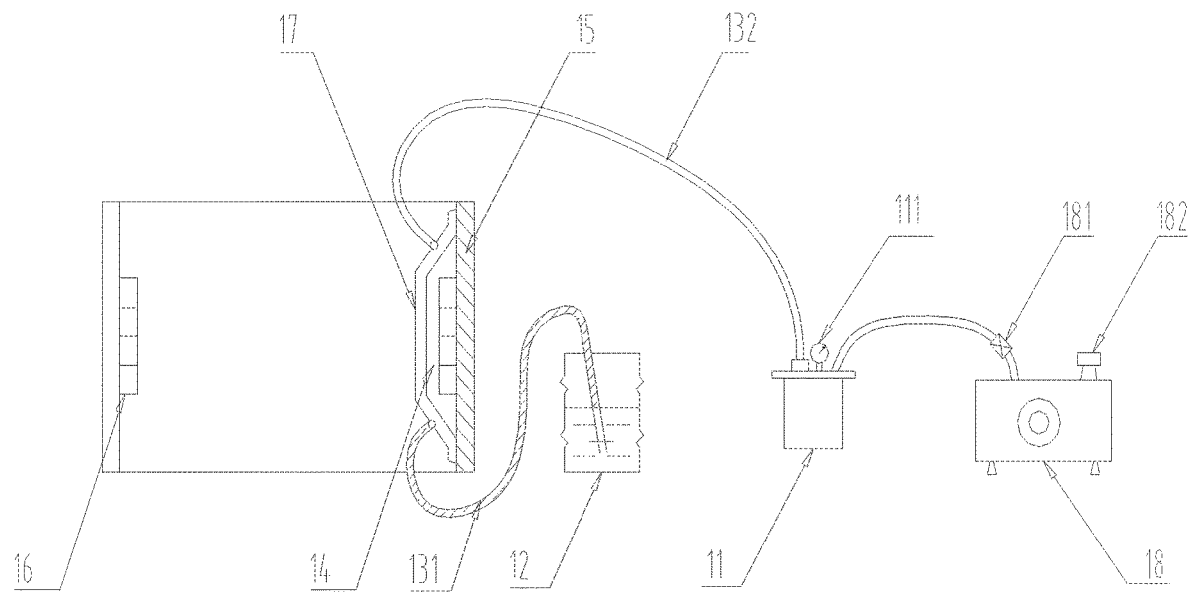
FIG. 1-1 is a schematic view of a shaping system for a protective layer for a magnetic pole of a permanent magnet motor.
Figures 1, 2:
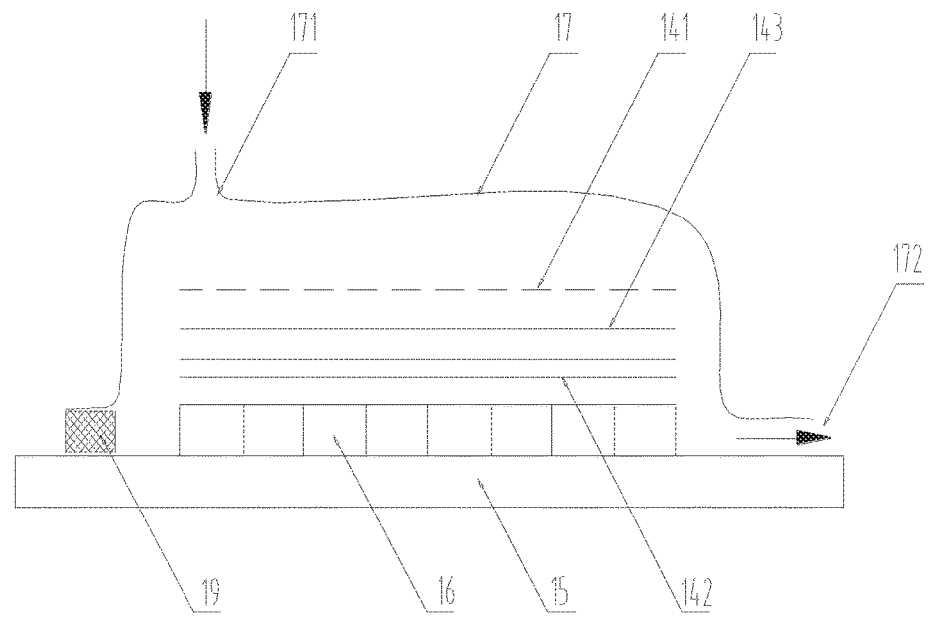
Figure 2:
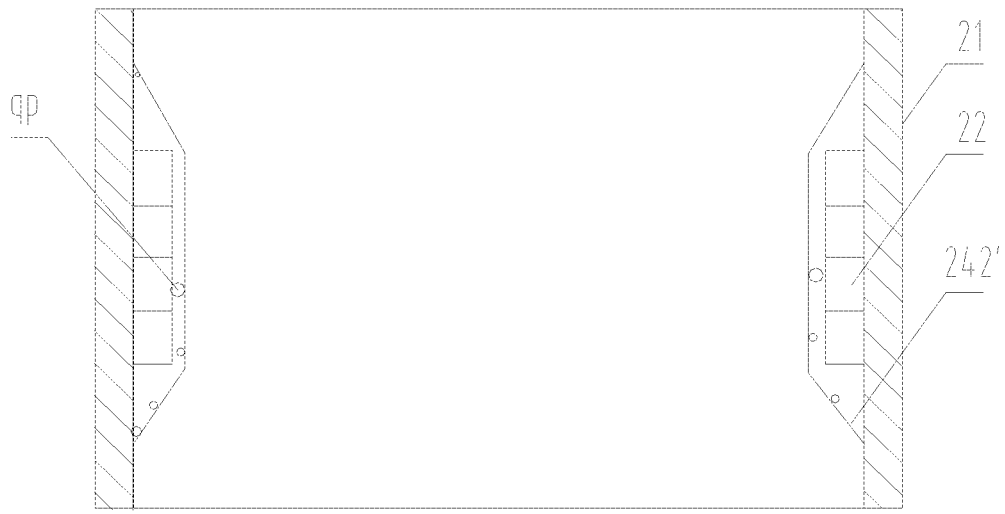

| 11 | resin collector, | 12 | resin system tank, |
|---|---|---|---|
| 142 | reinforcing material, | 141 | flow guiding net, |
| 143 | demoulding cloth, | 15 | magnetic yoke, |
| 16 | magnet steel, | 17 | vacuum bag, |
| 171 | adhesive injection port, | 172 | discharge port, |
| 18 | vacuum pump, | 181 | regulating valve, |
| 182 | drive motor, | 19 | sealing strip, |
| qp | bubble. | | |

EXPLANATION OF REFERENCE NUMERALS IN FIGS. 3 TO 12

| 21 | magnetic yoke, | 22 | magnet steel, |
|---|---|---|---|
| 231 | input pipeline, | 232 | output pipeline, |
| 233 | flowmeter, | 241 | flow guiding net, |
| 242 | reinforcing material, | 242' | protective layer, |
| 243 | demoulding cloth, | 25 | vacuum bag, |
| 251 | injection port, | 252 | discharge port, |
| 26 | pressing strip, | 27 | stator iron core, |
| 28 | bolt, | 29 | magnetic pole plug, |
| a | inclined contact surface, | b | vertical contact surface; |
| 31 | electric heating film, | 32 | heat insulation layer, |
| 33 | sealing and shielding thermal insulation cover, | | |
| 34 | far-infrared heat source, | 35 | radiant heater, |
| 36 | ultrasonic wave emitting device, | 361 | ultrasonic wave emitting head, |
| 362 | emitting chamber; | 41 | temperature sensor, |
| 42 | pressure sensor, | 43 | temperature sensor; |
| 51 | air heater, | 52 | air inlet filter; |
| 60 | outlet air filter, | | |
| 61 | desorption process measurement device; | | |
| 70 | vacuum pump, | 71 | vacuum pump regulating valve, |

-continued

| | | | |
|---|---|---|---|
| 72 | drive motor; | | |
| 81 | thickness measurement device, | | |
| 82 | filling progress measurement device; | | |
| 90 | resin collector, | 91 | vacuum gauge; |
| 101 | resin stirring tank, | 102 | resin output tank, |
| 103a | first regulating valve, | 103b | second regulating valve, |
| 104 | ultrasonic debubbling vibrating bar, | 105 | second air outlet, |
| 106 | electric motor, | | |
| 106a | ultrasonic high-frequency vibration emission head, | | |
| 106b | stirring blade, | 106c | hollow shaft, |
| 106d | heating resistor, | 107 | first air outlet, |
| 200 | microwave preheating device, | 201 | control unit, |
| 202 | microwave source, | 203 | circulator, |
| 204 | stub tuner, | 205 | resin chamber, |
| 206 | cooling system, | 207 | water load, |
| 208 | first manifold, | 209 | regulating valve, |
| 210 | second manifold; | 300 | annular casing, |
| qp | hole. | | |

DETAILED DESCRIPTION OF EMBODIMENTS

In order to make the person skilled in the art have a better understanding of the technical solutions of the present application, the present application is described hereinafter in further detail in conjunction with the drawings and embodiments.

Figure 3:
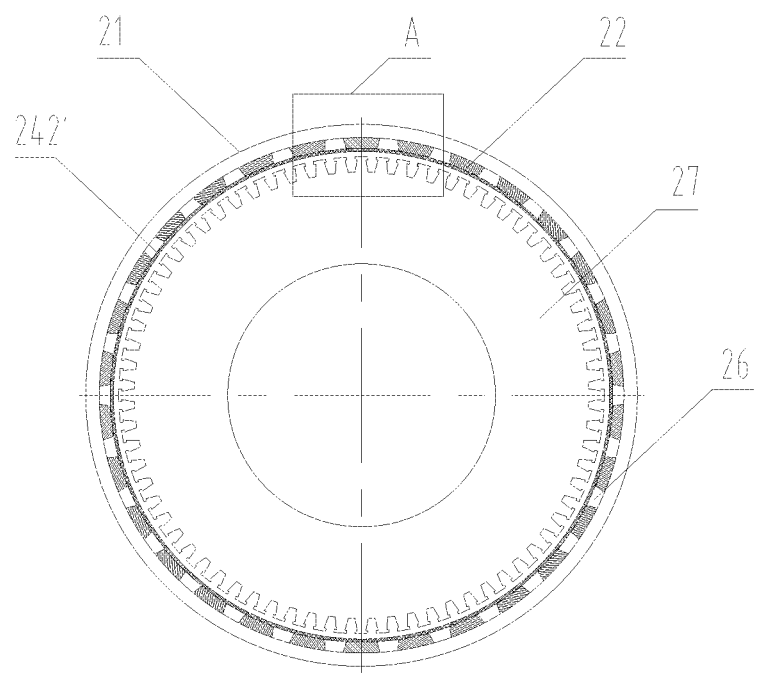
FIG. 3 is a schematic view showing the structure of a magnetic pole component of the permanent magnet motor and a protective layer for the magnetic pole component.
Figure 4:
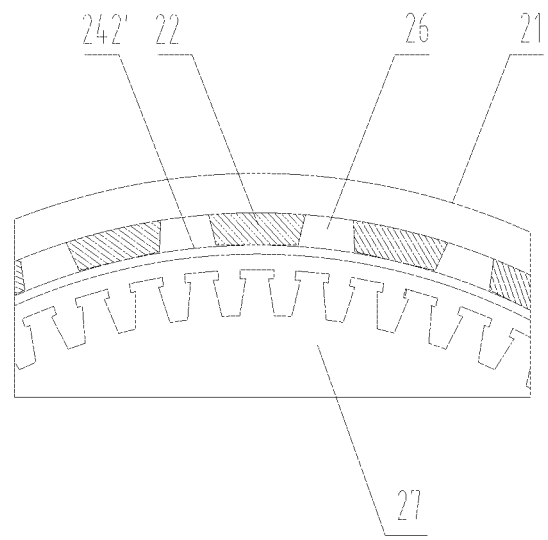
FIG. 4 is a partially enlarged schematic view of part A in FIG. 3.
Figure 5:
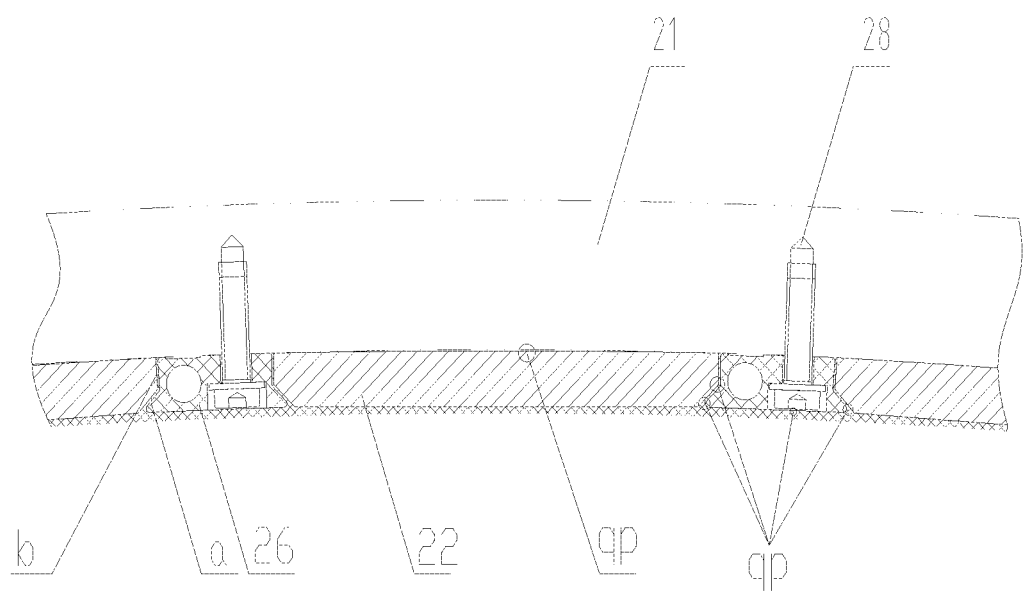
FIG. 5 is a schematic view of a pressing strip in FIG. 3 pressing the magnet steel tightly against a wall surface of a magnetic yoke.
Figure 6:
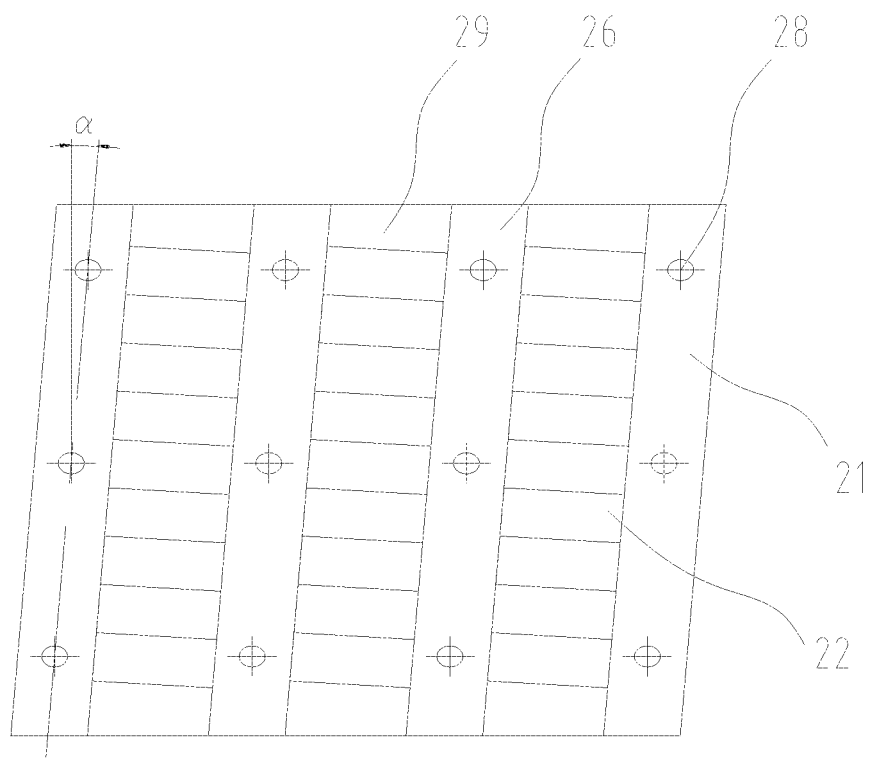
FIG. 6 is a developed view showing the wall surface of the magnetic yoke on which the magnet steels are mounted in FIG. 5.

Reference is made to FIGS. 3 to 6. FIG. 3 is a schematic view showing the structure of a magnetic pole component of a permanent magnet motor and a protective layer for the magnetic pole component. FIG. 4 is a partially enlarged schematic view of part A in FIG. 3. FIG. 5 is a schematic view showing that a magnet steel is pressed tightly against a wall surface of a magnetic yoke by a pressing strip. FIG. 6 is a developed view showing the wall surface of the magnetic yoke on which the magnet steels are mounted in FIG. 5.

The magnetic pole component shown in FIG. 3 includes an outer rotor structure and a stator iron core 27 matching with the outer rotor structure. Magnet steels 22 are pressed tightly against an inner wall of a magnetic yoke 21 of the outer rotor by pressing strips 26. The magnet steels 22 and the inner wall of the magnetic yoke 21 as well as the pressing strip 26 are covered by a protective layer 242'. The pressing strip 26 are fixed to the magnetic yoke 21 by bolts 28. FIG. 5 is a radial view of the magnetic yoke 21 of the outer rotor of the permanent magnetic pole component. A bolt head of each bolt 28 is located inside the respective pressing strip 26, the inner wall of the magnetic yoke 21 is provided with threads, and the pressing strip 26 is fastened by the bolt 28 by means of the threads. The pressing strips 26 are fixed to the inner wall of the magnetic yoke 21 to indirectly fix the magnet steels 22. A row of magnet steels 22 is blocked at each of two ends thereof by a magnetic pole plug 29, and the installed magnet steels 22 are arranged obliquely at an inclination angle α, as shown in FIG. 6.

In FIG. 5, each magnet steel 22 have two contact surfaces in contact with the adjacent pressing strip 26, including a vertical contact surface b and an inclined contact surface a as shown in the figure. The thickness of the pressed magnet steel 22 is higher than a corner portion of a trapezoidal inclined surface, and the pressing strip 26 enters the upper surface from the corner portions, formed by the vertical contact surface b and the inclined contact surface a, at two ends of the magnetic steel 22. As analyzed and viewed from the perspective of elastic mechanics, a "qualitative" change occurs in a front-rear direction, and the compressive strength that the magnet steel 22 can withstand also changes. As for the magnet steel 22, in the process that the magnet steel 22 is moved after being fixed by the pressing of the pressing strip 26 and the magnetic pole of the motor is in operation, a risk that the ends of the magnet steel 22 are broken due to the stress is reduced. However, there are still hidden dangers that the bolt 28 may become loose, be broken and fall off after continuously working for a long time. Under the action of a radial pulsed magnetic pulling force applied by a stator armature of a generator and a torque in a circumferential direction of the inner wall of the magnetic yoke 21, the movement of the magnet steel 22 between the two adjacent pressing strips 26 inevitably becomes play from pure vibration, thus, the contact surfaces of the magnet steel 22 are subjected to a local stress to generate cracks, which causes local fragmentation. In the face of the hidden dangers indeed existing in the above structure, it is required to improve the process, to improve the integration effect of filling, bonding and curing of an impregnation liquid.

Figure 7:
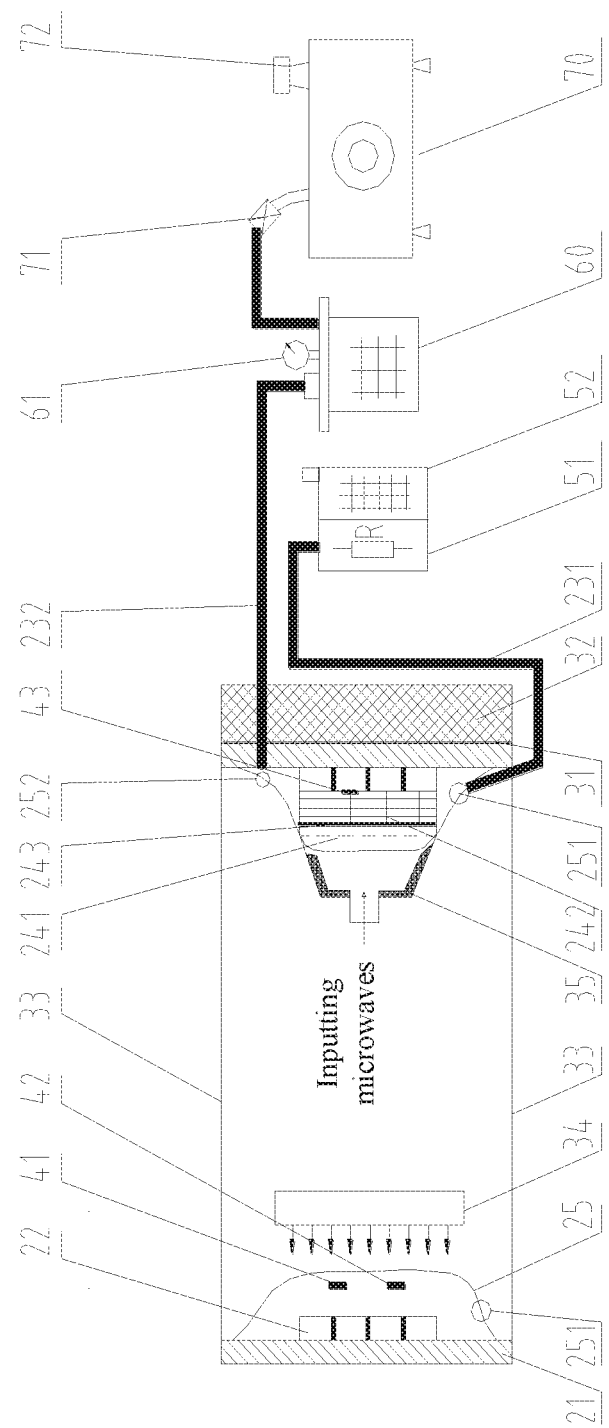
FIG. 7 is a schematic view showing the structure of an embodiment of a vacuum desorption system in a flexible molding system according to the present application.

As described in the background, a resin flexible molding process requires the reinforcing material 242 (In FIG. 7, the impregnation liquid is injected into the reinforcing material 242 to form the protective layer 242' shown in FIG. 4). There is often a gap between the reinforcing material 242, such as a fiberglass cloth, and the magnet steel 22 and a gap between the reinforcing material 242 and the wall surface of the magnetic yoke 21, and the reinforcing material 242 itself is a textile made from a porous material, which also has gaps.

Air and water vapor may be adsorbed in these gaps. Water may cure an adhesive material having an isocyanate group, and with release of carbon dioxide, a foamed polymer may be formed. The carried water in actual may gasify when the temperature reaches 43 degrees Celsius in a vacuum environment, thus, bubbles are generated.

In addition, after an upper two-thirds region of the magnetic pole component is filled up with the impregnation liquid, a vacuum pressure difference between the pressure inside the closed system and the pressure outside the closed system is close to a vacuum degree. However, a lower one-third region of the magnetic pole component is closer to an injection port 251 of the impregnation liquid (referring to FIG. 7), the pressure difference between the inside and outside at this region is lower than the pressure difference at the upper two-thirds region in a later stage during injection, and the pressure applied by an outer surface against the reinforcing material 242 at this region is lower than that at the upper two-thirds region. During the vacuum adhesive injection, air and water vapor carried in the material at the lower one-third region is more difficult to be discharged, and many holes are formed in the lower one-third region.

Reference is made again to FIG. 5 in conjunction with FIG. 6, bubbles are apt to be generated at each of joints between the magnet steels 22 and the pressing strips 26, gaps between the heads of the bolts 28, the magnet steels 22 and the magnetic yoke 21, gaps between the magnetic pole plugs 29 and the pressing strips 26 and between the magnetic pole plugs 29 and the magnet steels 22. Various non-removed bubbles become holes qp in the protective layer 242' after the protective layer 242' is cured (in addition to being formed by bubbles, the holes qp may possibly be formed by being enclosed by the impregnation liquid with inconsistent flowing speeds in the process of impregnation).

It has been found through research that, the hole formed in the protective layer 242' is equivalent to a "micro water bag". Once water enters, the osmotic pressure in the "micro water bag" increases, causing interfacial debonding, and water is adsorbed on the surface of the bonding body to replace the resin binder adsorbed on the bonding body. Water may have a chemical effect on the resin, causing breakage and degration of the resin. Water may especially have a significant chemical corrosion effect on the surface of the glass fiber. When water enters the surface of the glass fibers, the alkali metal on the surface of the glass fiber is dissolved in the water, such that the aqueous solution becomes alkaline, which accelerates the corrosion damage to the surface, resulting in disintegration of the silica skeleton of the glass, a decreased fiber strength, a degraded performance of the composite material, thus, the protective layer 242' may have a reduced strength, and may even be peeled off. For wind power generators erected on the seashore, the presence of such holes is particularly damaging and may cause substantial losses.

For reducing the holes in the protective layer 242' formed after the impregnation liquid is injected, based on the reasons analyzed above, this solution is mainly for reducing the bubbles presented in the forming process of the protective layer 242', and has three process steps including a desorption process, an impregnation process and a curing process.

Referring to FIG. 7, FIG. 7 is a schematic view showing the structure of an embodiment of a vacuum desorption system in a flexible molding system according to the present application.

In this embodiment, the magnet steel 22 is provided on the inner wall of the magnetic yoke 21, and then the reinforcing material 242, the demoulding cloth 243, the flow guiding net 241 and the vacuum bag 25 are laid in the listed sequence. A sealed system is formed between the vacuum bag 25 and the magnetic yoke 21, and an injection port 251 and a discharge port 252 are formed. The injection port 251 may be used for injecting the impregnation liquid, and the discharge port 252 may be similarly used for discharging the impregnation liquid. In this solution, the injection port 251 and the discharge port 252 further function as an inlet and an outlet for the desorption, respectively.

In this case, the vacuum bag 25 and the magnetic yoke 21 form the sealed system that is separated from the outside. The volume of the sealed system is actually defined by the gaps between the vacuum bag 25, the flow guiding net 241, the demoulding cloth 243, the reinforcing material 242, the magnetic yoke 21, the magnet steels 22 and the pressing strips 26, and the pipelines (including a pipeline connected to a vacuum pump 70 and a pipeline connected to an air filter shown in the figure, that is, an input pipeline and an output pipeline) in communication with the outside, in which the gaps and the pipelines are connected in series. The sealed system in this case is equivalent to a vacuum container, and thus, the vacuum container formed by this sealed system and the vacuum pump 70 constitute a vacuum system.

Figure 8:
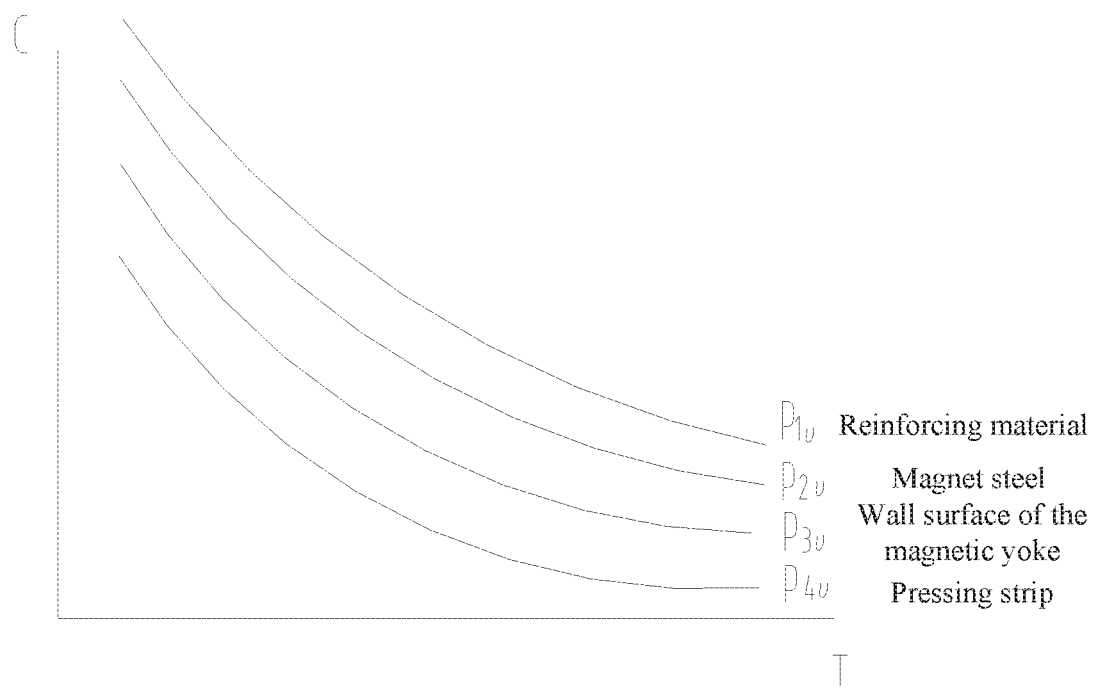
FIG. 8 is a relational diagram showing that an air adsorption amount of a solid surface of the magnetic pole component changes as the temperature of the solid surface increases.

Through research, a temperature rising desorption test is performed. Reference is made to FIG. 8, FIG. 8 is a relational diagram showing that the air adsorption amount of the solid surface of the magnetic pole component changes as the temperature of the solid surface increases. It may be seen from the figure that, for each of the reinforcing material 242 of the protective layer 242', the magnet steels 22, the wall surface of the magnetic yoke 21 and the pressing strips 26 for fixing the magnet steels 22 in the magnetic pole component of the permanent magnet motor, the air adsorption amount of the solid surface decreases as the temperature increases. Therefore, in the present application, heating desorption may be performed to the sealed system, that is, the air adsorption amount is reduced by increasing the temperature, thereby reducing the bubbles from the source.

It may also be seen from FIG. 8 that adsorption capacities of the four materials are different, and have consistent differences. Since the reinforcing material 242 is a fibrous porous material, the air is not easy to be desorbed from the reinforcing material 242. Therefore, during the desorption process, the desorption from the reinforcing material 242 is considered as a minimum qualified limit. That is, the temperature should meet the desorption requirement of the reinforcing material 242, and correspondingly, the desorption requirements of the other three structures may just be met as well.

Reference is further made to FIG. 7. As shown in the figure, there are multiple types of devices for performing heating desorption. Three types of heating structures are shown in the figure, which are an electric heating film 31, a far-infrared heating structure and a microwave heating structure, respectively.

In the figure, the rotor is in an outer rotor structure, the electric heating film 31 is laid onto an outer wall of the magnetic yoke 21, and the electric heating film 31 is in close contact with the outer wall of the magnetic yoke 21 for heating. The electric heating film 31 may perform uniform heating and is suitable for heating the magnetic yoke 21. In addition, a heat insulation layer 32 may be further provided on the outer wall of the electric heating film 31, and the heat insulation layer 32 makes the heating of the magnetic yoke 21 more energy-saving. At the same time that the magnetic yoke 21 is heated, the magnet steels 22 and the reinforcing material 242 at an inner side of the magnetic yoke 21 are heated as well by heat conduction, thereby achieving temperature rising desorption of the air.

A far-infrared heat source 34 is also shown in the figure. The far-infrared heat source 34 is provided in an inner cavity of the outer rotor, for heating an outer surface of the vacuum bag 25 of the magnet steels 22 laid at the inner side of the magnetic yoke 21. The vacuum bag 25 employs a material suitable to be penetrated by an infrared ray. The vacuum bag 25 with a high penetration rate is selected. The far-infrared ray to be emitted selects a wavelength having a high absorptivity for the flow guiding net 241 and the demoulding cloth in the vacuum bag 25. In the procedure of the far-infrared heating, the frequency of the ray generated by heat radiation of the heat source is adjusted to adapt to selective absorption, thereby facilitating obtaining an absorptivity with the highest efficiency. The frequency of the ray may be determined through tests. In a test method, spectral radiation is performed on the material of the vacuum bag 25, to obtain the result of selective absorption of an inside surface of the vacuum bag 25. Then, taking the influence of the flow guiding net 241 inside the vacuum bag 25 on the absorptivity into account, the heat radiation absorptivity of each of the vacuum bag 25 and the flow guiding net 141 is obtained, thereby obtaining an equivalent "absorption coefficient" of the entire protective layer 242' during resin filling, impregnation, infiltration, at the beginning of curing and in the entire curing procedure. According to this absorption coefficient, the radiation power and the radiation heating law of the far-infrared heat source 34 are determined. The value of this measure lies in that manufacturing waste due to excessively great power of the far-infrared heat source 34 can be avoided, and the efficiency of the curing procedure will not affected due to excessively small power or insufficient power.

A microwave device includes a microwave controller, a radiant heater 35 (that is, a heating structure for inputting microwaves and in a horn shape in the figure) and a water storage sponge. Sealing and shielding thermal insulation covers 33 are provided at an upper end and a lower end of the magnetic yoke 21, for sealing and thermal isolation. In one aspect, leakage of microwaves is prevented, which ensures the safety. In another aspect, dissipation of the heat is prevented, and the heating effect is ensured. The microwaves are emitted to the surface of the vacuum bag 25, for heating the interior of the vacuum bag 25.

Each of the magnetic yoke 21 and the magnet steels 22 has a metal surface. After microwaves are emitted to the magnetic yoke 21 and the magnet steels 22, the microwaves may be rebounded. Here, the water storage sponge is provided at an inner side of the radiant heater 35, the moisture in the water storage sponge has a high microwave absorptivity, and thus by providing the water storage sponge at a horn-shaped housing of the radiant heater 35, it can facilitate absorption of the rebounded microwaves, to prevent the rebounded microwaves from damaging a microwave emitting head. Apparently, other wave absorbing materials may also be adopted.

Theoretically, by considering a distance between the microwave emitting head and 30 the magnetic yoke 21 as well as a distance between the microwave emitting head and the magnet steels 22, the frequency and the wavelength of the microwaves can be set by the microwave controller, which may also prevent the microwaves from damaging the emitting head, and the reinforcing material 242 and the flow guiding net 141 can absorb a part of microwaves as well. In the figure, the radiant heater 35 is arranged in the horn shape, which facilitates the water storage sponge absorbing the rebounded microwaves. Of course, the radiant heater 35 is not limited to this structure. Compared with other heating methods, the heating method using microwaves inputted by the radiant heater 35 can achieve a better desorption effect, and since the liquid has a high microwave absorptivity. The microwaves can heat the moisture timely and promptly, thus, the moisture may be vaporized and desorbed rapidly under the action of the microwaves.

In addition to the far-infrared heating, the microwave heating or the heating using the electric heating film described above, the desorption effect may also be improved by an ultrasonic device. The ultrasonic device may input ultrasonic waves into the vacuum bag 25. In this case, the injection port 251 provided in the sealed system may serve as an ultrasonic wave input port. The ultrasonic device may also directly emit the ultrasonic waves onto the surface of the vacuum bag 25, and in this case, it is preferable that a vacuum environment is already established in the sealed system, such that the ultrasonic waves may be transmitted to the magnet steels 22 and the magnetic yoke 21 when the ultrasonic waves acts on the surface of the vacuum bag 25. The ultrasonic waves may generate certain triggering and vibrating effects, which facilitates the escaping of the bubbles in the sealed system, thereby achieving the desorption. In the case that the frequency of the ultrasonic waves exceeds a certain value, a certain heating desorption effect may also be achieved.

According to the actual working conditions in conjunction with the cost, control and other factors, the four desorption methods described above may be performed individually or at least two of the four desorption methods may be performed in combination.

Reference is further made to FIG. 7. In FIG. 7, the injection port 251 is further connected to an air inlet filter 52 and an air heater 51. The vacuum pump 70 may suction heated and filtered dry air into the sealed system. By introducing clean dry air, possible residual impurities and water vapor and the like may be taken out, to achieve a more thorough desorption. In addition, the entire sealed system may be heated well by introducing the hot air, making preparation for subsequent injection of the impregnation liquid.

An outlet air filter 60 may be further provided between the discharge port and the vacuum pump 70, to prevent the impurities or water vapor or the like suctioned out from adversely affecting the performance of the vacuum pump 70. In addition, desorption procedure measurement may be performed on the air which is suctioned out. A desorption process measurement device 61 shown in FIG. 7 may be provided at the position of the outlet air filter 60. The desorption process measurement device 61 may measure the contents of the impurities and the water vapor (mainly the water vapor) flowing through the air, thereby monitoring the effect of the desorption procedure. When the content of the water vapor is reduced to a certain value, it indicates that the required desorption target is achieved and the desorption is completed, thus, the next step of injection of the impregnation liquid may be carried out. The desorption process measurement device 61 may specifically be a water vapor content analyzer, which can includes a simple device for condensing the water vapor and then detect the content by a test paper.

In this solution, the step of introducing the hot air may be performed at the same time as the step of microwave heating, the step of far-infrared heating, the step of heating by the electric heating film, the step of emission of the ultrasonic waves described above.

The above solution illustrates that how to perform the desorption process before the injection of the impregnation liquid so as to reduce the bubbles that may be generated during the injection of the impregnation liquid as far as possible. In the following embodiment, the procedure of injecting the impregnation liquid is further discussed based on the above solution.

Figure 9:
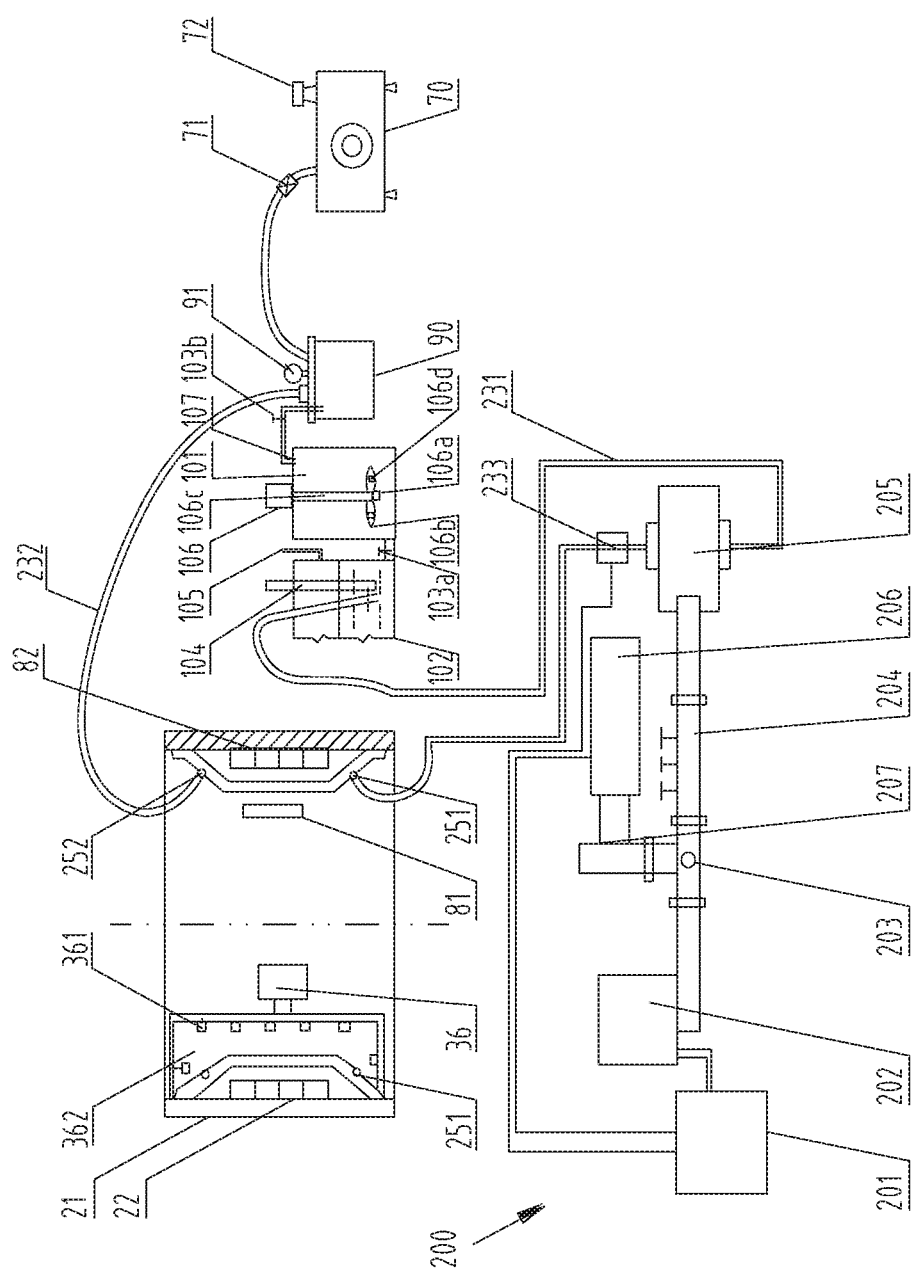
FIG. 9 is a schematic view showing the structure of an embodiment of a vacuum impregnation process system in the flexible molding system according to the present application.

Reference is made to FIG. 9, which is a schematic view showing the structure of an embodiment of a vacuum impregnation process system in the flexible molding system according to the present application.

In this embodiment, the injected impregnation liquid is a mixed liquid including resin and a curing agent. The resin is stored in a resin system tank and mixed with the curing agent in a certain proportion for use. The resin system tank specifically includes a resin stirring tank 101 and a resin output tank 102 which are in communication with each other. The resin stirring tank 101 is located upstream of the resin output tank 102. A stirrer is provided inside the resin stirring tank 101. The system is further provided with an electric motor 106. The electric motor 106 may drive the stirrer to rotate, to stir the resin before it is injected. The stirring procedure facilitates the escaping of bubbles that may be contained in the resin in the resin stirring tank 101, thereby preventing the bubbles from entering the sealed system. A communication pipe is provided between the resin stirring tank 101 and the resin output tank 102. The stirred resin flows into the resin output tank 102. The communication pipe may be provided with a first regulating valve 103*a* for adjusting the amount of the resin entering the resin stirring tank 101. When the first regulating valve 103*a* is closed, the stirring tank 101 may be separated from the output tank 102.

In order to increase the escaping speed and the escaping amount of the bubbles, the above stirrer may be a heating stirrer configured to stir while heating. According to the Henry's law that may reflect the law of solubility of gas in liquid, the solubility of the gas in the resin may be reduced by increasing the temperature, thereby accelerating the escaping of the bubbles.

Specifically, as shown in FIG. 9, an output shaft of the electric motor 106 is a hollow shaft 106*c*. Extension wires of a winding of the electric motor 106 extend downwardly from a hollow cavity of the hollow shaft 106*c* and form an electrical circuit. A three-phase winding corresponds to three stirring blades 106*b*. A heating resistor 106*d* is provided inside the stirring blade 106*b*. The extension wires may serve as a power supply for the heating resistor 106*d*. Thus, when the electric motor 106 is started, a heating function may be achieved. In this structure, electrical wires of the winding of the electric motor 106 are subtly elongated and extend beyond the electric motor 106 to serve as a power source, thus the electric energy from the electric motor 106 is introduced to the position of the stirring blade 106*b* at a lower end. Thus, an electric heating function of the stirring blades 106*b* in a limited space is achieved.

Figure 10:
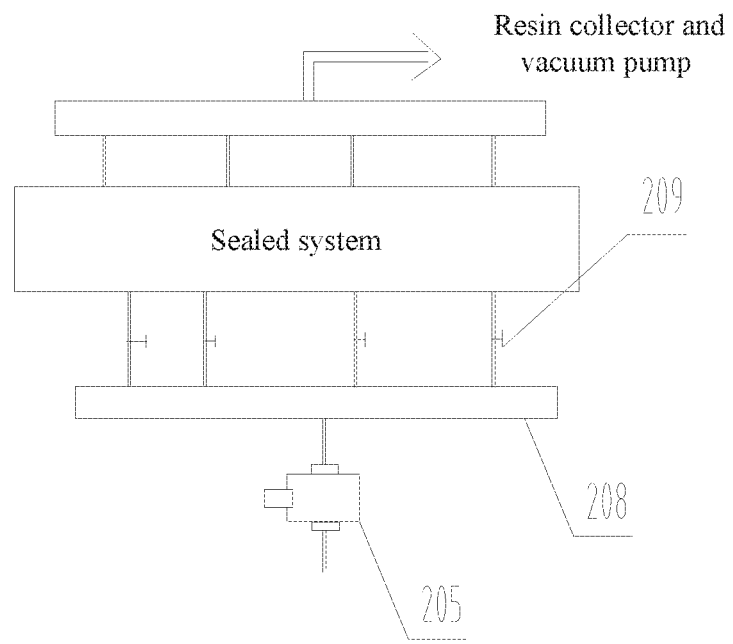
FIG. 10 is a schematic view showing a second structure in which a microwave preheating device and a sealed system in FIG. 9 are in communication with each other.

In addition, in order to further facilitate discharging of the bubbles, an ultrasonic high-frequency vibration emission head 106*a* is further provided. As shown in FIG. 10, the electric motor 106 carries an ultrasonic wave emitting device. Similarly, the ultrasonic wave emitting device transmits the power to the ultrasonic high-frequency vibration emission head 106*a* located at the bottom of the hollow shaft 106*c* through the hollow shaft 106*c* of the electric motor 106. The emitted ultrasonic waves facilitate exciting the bubbles to discharge the bubbles, and may suppress the resin from accumulating on the stirring blades 106*b*, thereby ensuring the service life of the stirring blades 106*b*. The electric motor 106 generates an alternating current, and in order to allow the electric motor 106 to drive the ultrasonic high-frequency vibration emission head 106*a*, a micro frequency converter, i.e., an electric energy processing module, is provided inside the hollow shaft 106*c*, and the voltage and the output frequency of the micro frequency converter are adjustable, so as to allow the electric power supplied to an actuator of the ultrasonic high-frequency vibration emission head 106*a* to have adjustable frequency and voltage. In this case, the above extension wires are connected to the micro frequency converter to form a circuit, and the electric energy is output from the micro frequency converter to the stirring blades 106*b* and the ultrasonic high-frequency vibration emission head 106*a*.

An ultrasonic debubbling vibrating bar 104 is further provided in the resin output tank 102. The principle of the ultrasonic debubbling vibrating bar 104 is the same as the principle of the ultrasonic high-frequency vibration emission head 106*a* located inside the resin stirring tank 101, and is also provided for further improving the debubbling effect.

In addition, an upper portion, specifically a top, of the resin stirring tank 101 is provided with a first air outlet 107. The first air outlet 107 is in communication with the vacuum pump 70, and may be specifically in communication with the air filter 60 as shown in the figure, thus, the escaped air after stirring and heating may be suctioned and taken away by the vacuum pump 70, to accelerate the discharge of gas inside the resin stirring tank 101. A second regulating valve 103*b* may be provided between the first air outlet 107 and the outlet air filter 60. Here, the second regulating valve 103*b* may separate the stirring tank 101 from the vacuum pump 70, for example, a passage between the stirring tank 101 and the vacuum pump 70 may be cut off when suction is not required after the impregnation is completed or the impregnation liquid is prepared. The resin outlet tank 102 is provided with a second air outlet 105, which also facilitates the discharging of the gas further escaped out after the ultrasonic vibration. In fact, the second air outlet 105 may be alternatively in communication with the vacuum pump 70. Of course, here, the second gas outlet 105 is not in communication with the vacuum pump 70, but is directly in communication with the atmosphere, which is good for the establishment of the pressure difference, thereby facilitating the impregnation liquid inside the output tank 102 being suctioned and input into the sealed system.

The debubbled resin is injected into the sealed system via the injection port 251 through the input pipeline 231. In this embodiment, the resin in the input pipeline 231 is further preheated, which allows the resin to have a suitable temperature (in general, 30 degrees to 35 degrees) before entering the sealed system and to have an appropriate viscosity, thereby achieving a good impregnation effect.

In this embodiment, the device for preheating the resin in the input pipeline 231 is a microwave preheating device 200. The microwave preheating device 200 includes a microwave source 202, a waveguide, a stub tuner 204, a cylindrical high-frequency heat generation electrode, a circulator 203, a water load 207, a cooling system 206 for the water load 207, and a microwave control unit 201. The working principle of the microwave preheating device 200 may be understood with reference to the conventional technology.

The microwave preheating device 200 is provided with a resin chamber 205. The input pipeline 231 is in communication with the resin chamber 205. Microwaves from the microwave preheating device 200 are emitted into the resin chamber 205, and the resin chamber 205 then heats the electrode by the microwaves. Providing the resin chamber 205 facilitates safe microwave heating. Here, it should be specially noted that, in this embodiment, a non-metallic screen plate is preferably provided inside the resin chamber 205. The screen plate is provided with multiple screen openings. After the resin enters the resin chamber 205 through the input pipeline 231, the resin continues flowing to pass through the screen plate and pass through the screen openings. In this way, when the resin flows through the resin chamber 205, the resin may be screened into several drop-shaped resins by the screen plate. When the microwaves are emitted to the multiple drop-shaped resins, the drop-shaped resins may be heated. Compared with other heating methods, this heating method makes the resin be heated very uniformly, thereby facilitating smooth performing of the subsequent impregnation procedure.

The microwaves shown in the figure are incident from a side surface of the resin chamber 205. Apparently, the present application is not limited to this structure. The microwaves may alternatively be incident toward a direction in which the resin enters, to face the drop-shaped resins, thereby enhancing the heating effect. The resin in the input pipeline 231 may be input into the sealed system from top to bottom or from bottom to top.

Figure 11:
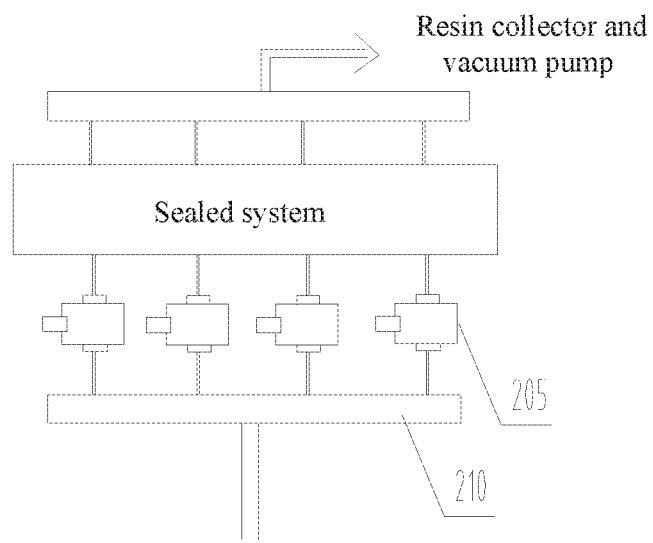
FIG. 11 is a schematic view showing a third structure in which the microwave preheating device and the sealed system in FIG. 9 are in communication with each other.

Reference is made to FIGS. 10 and 11. FIG. 10 is a schematic view showing a second structure in which a microwave preheating device and a sealed system in FIG. 9 are in communication with each other; and FIG. 11 is a schematic view showing a third structure in which the microwave preheating device and the sealed system in FIG. 9 are in communication with each other.

In FIG. 10, an annular first manifold 208 is provided between the microwave preheating device 200 and the sealed system. The resin chamber 205 of the microwave preheating device 200 is in communication with the first manifold 208, and the first manifold 208 is provided with several outlets that are in communication with the sealed system. That is, the impregnation liquid which has been preheated uniformly in the resin chamber 205 can flow from the several outlets to the sealed system, thereby facilitating the uniform injecting of the impregnation liquid into the sealed system in a circumferential direction of the sealed system.

In this case, a regulating valve 209 may be provided between each of the outlets of the first manifold 208 and the sealed system. Thus, the openings of the regulating valves 209 may be regulated according to the overall injection progress of the impregnation liquid into the sealed system, so as to keep the overall injection progress consistent.

As shown in FIG. 11, an annular second manifold 210 may be further provided between the system tank and the microwave preheating device 200. In this case, the microwave preheating device 200 may be provided with several resin chambers 205, and outlets of the several resin chambers 205 may be in communication with different inlets of the sealed system. That is, the sealed system is provided with multiple inlets, which can be evenly distributed in the circumferential direction. The impregnation liquids entering the inlets can be heated separately, thus, the heating can be more uniform. Of course, in the embodiment shown in FIG. 10, only one resin chamber 205 is provided, which is less costly and more environmentally friendly.

The resin heated by microwaves continues to enter the input pipeline 231. In this case, a flowmeter 233 may be provided to detect a conveying speed of the resin. According to the magnitude of the conveying speed, the viscosity of the resin is adjusted, for example, by adjusting the intensity of microwave heating. A measurement result of the flowmeter 233 in FIG. 9 is fed back to the control unit 201 of the microwave preheating device 200, so as to allow the control unit 201 to adjust the intensity of the microwaves according to the conveying speed.

In the impregnation process system, the output port of the sealed system is connected to an output pipeline 232. The output pipeline 232 is connected to the vacuum pump 70. The output pipeline 232 may be provided with a resin collector 90. An injection pressure for the impregnation liquid is generated by the suction of the vacuum pump 70. During the injection, the resin may be suctioned out through the output port and enter the resin collector 90, thus the provision of the resin collector 90 may prevent the resin from being suctioned into the vacuum pump 70 which may affect the performance of the vacuum pump 70.

During the injection of the impregnation liquid, vacuum suction performed by the vacuum pump 70 establishes a pressure gradient for filling the resin. A further improvement of this solution is to perform a "variable pressure" control of the injection procedure. In this solution, during the suction performed by the vacuum pump 70, the drive motor 72 of the vacuum pump 70 performs a variable frequency adjustment by the frequency converter. The rotation speed of the drive motor 72 is changed to adjust the average suctioned gas volume flow of the vacuum pump 70, thereby allowing the pressure in the sealed system to change. That is, the average suctioned gas volume flow of the vacuum pump 70 may be increased for a predetermined time and then decreased for a predetermined time. The procedure of increasing and then decreasing of the average suctioned gas volume flow described above is repeated several times, thereby achieving the "variable pressure" control. The impregnation liquid may be cured over a period of time. In general, it is required to complete the injection of the impregnation liquid within 20 minutes to 30 minutes. When performing the above "variable pressure" control, the predetermined times for increasing and decreasing may be set based on a total period of time for impregnation and may be determined specifically according to an actual situation, so as to facilitate full impregnation.

When a low pressure is generated by the suction of the vacuum pump 70, the resin may be drew to flow into the sealed system for a short time. However, when the pressure is remained low for a long time, the reinforcing material 242 may tightly adhere to the magnet steels 22 and the magnetic yoke 21. In this case, the sealed system have a small volume, the flow of the resin may stagnate, that is, although the low pressure is established and a pressure gradient is generated, a phenomenon of poor flowability may occur subsequently. Therefore, in this solution, after suctioning at a high rotation speed for a period of time, the vacuum pump 70 operates at a reduced rotation speed so as to achieve a relaxing effect for releasing the restraint. The impregnation liquid previously injected will fall by itself under the force of gravity, thus a lower empty region, unfilled due to the enclosing phenomenon of the flowing of the impregnation liquid, is filled, which is equivalent to increasing the "backflow". Then, when the rotation speed is increased once again, a low pressure is established again, and the flow is driven and guided, which achieves a drawing and pulling effect. When the vacuum bag 25 is further tightly suctioned again, a certain radial force is generated correspondingly, that is, the impregnation liquid may be radially squeezed by the vacuum bag 25, thereby facilitating the impregnation liquid filling the gaps between the reinforcing material 242, the magnet steels 22 and the inner wall of the magnetic yoke 21, to eliminate the bubbles.

Thus, in this solution, the "variable pressure" control is performed during the injection of the impregnation liquid, which may better reduce the empty region and allow the impregnation liquid to fill all the gaps as far as possible. Therefore, this solution is a preferred embodiment. A filling progress measurement device 82 may be provided to monitor a filling progress of the gap between the magnet steels 22 and the inner wall of the magnetic yoke 21. Moreover, a thickness measurement device 81 for the protective layer 242' may be further provided. The filling progress measurement device 82 and the thickness measurement device 81 may assist in determining whether the step of injection of the impregnation liquid is completed or not. The filling progress measurement device 82 may specifically include several sensors provided at the reinforcing material 242, to establish an electric bridge, so as to monitor the degree of injection of the impregnation liquid, for example, monitor whether there is a gap that has not being filled. The thickness measurement device 81 may specifically be embodied as a thickness gauge.

In addition, in the step of impregnation process, it may continue emitting ultrasonic waves, microwaves, far-infrared rays into the sealed system for heating and using the electric heating film 31 for heating. Reference may be made to the description of the desorption procedure for the far-infrared heating, the microwaves heating, and the heating using the electric heating film 31. The heating allows the reinforcing material 242, the magnet steels 22, and the magnetic yoke 21 to be heated, thus the contact angle of the impregnation liquid when being injected can be reduced, thereby facilitating sufficient infiltration and impregnation of the impregnation liquid.

Microwave heating is used in the impregnation step. The electromagnetic waves of the microwaves can better heat metal surfaces of the magnet steels 22 and the magnetic yoke 21. However, sparks may be generated when metal receives electromagnetic waves. Therefore, the method of heating the metal by microwaves is rarely used currently. However, as described above, in this solution, a part of the rebounded electromagnetic waves is absorbed by the reinforcing material 242 and the like, and a water storage sponge may also be provided, so that the microwaves are enabled to heat the metal safely.

Figure 12:
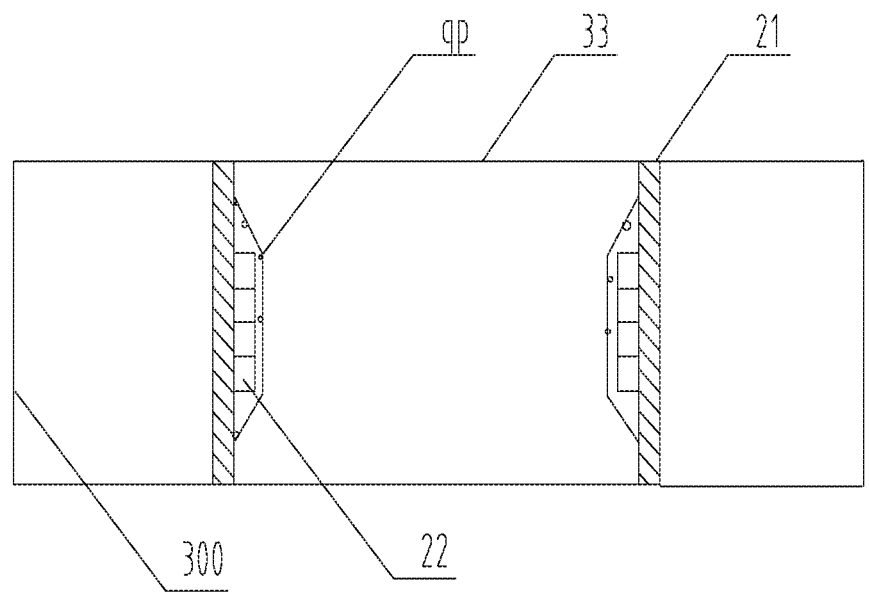
FIG. 12 is a schematic view showing the cooperation between the sealed system and an annular casing on which ultrasonic wave emitting devices are installed during impregnation.
Figure 13:
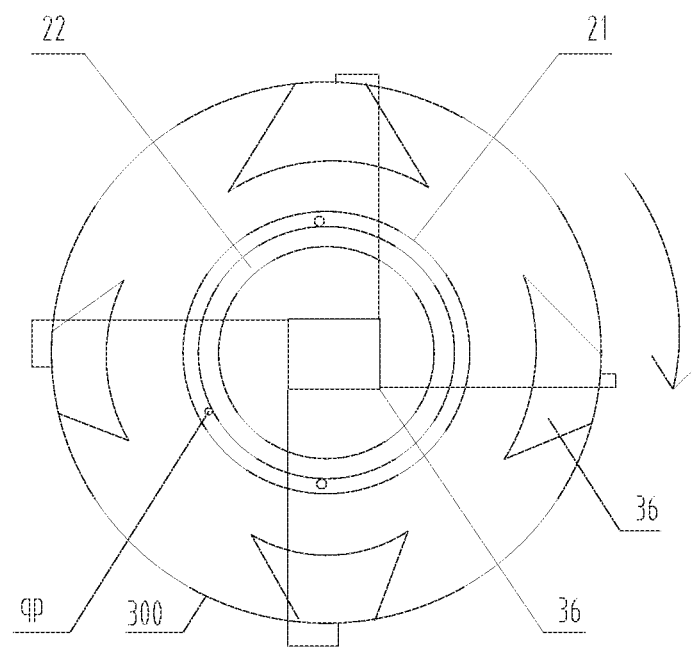
FIG. 13 is a schematic view showing the distribution of the ultrasonic wave emitting devices during impregnation.

In the case that ultrasonic waves are used during impregnation, the ultrasonic waves may be injected from the injection port 251 as in the desorption procedure shown in FIG. 7, and other ways may also be used. With continued reference to FIG. 9 in conjunction with FIGS. 12 and 13 for understanding, FIG. 12 is a schematic view showing the cooperation between the sealed system and an annular casing on which ultrasonic wave emitting devices are installed during impregnation; and FIG. 13 is a schematic view showing the distribution of the ultrasonic wave emitting devices during impregnation.

In this embodiment, in the case that ultrasonic waves are used in the impregnation step, ultrasonic wave emitting devices 36 may be provided at both an inside and an outside of the rotor. Like the previous analysis of FIG. 5, bubbles may be presented at each of the gaps between the magnet steels 22 and the magnetic yoke 21 and the gap between the magnetic pole plugs 29 and the magnetic yoke 21. In impregnation, if ultrasonic waves are emitted only to the inner side of the rotor, the ultrasonic waves serve as mechanical waves, their energy can hardly reach the back sides of the magnet steels 22, however, in the case that the ultrasonic wave emitting devices 36 are also arranged at the outside of the rotor, the rotor is "attacked internally and externally", so that the ultrasonic waves can act on all the bubbles in the gaps, which facilitates the escaping of the bubbles, and facilitates the infiltration and impregnation of the impregnation liquid and facilitates filling the impregnation liquid into all of the gaps.

Several ultrasonic wave emitting devices 36 may be uniformly arranged at the inside and the outside of the rotor, and the several ultrasonic wave emitting devices 36 are rotatable. In FIG. 13, four groups of the ultrasonic wave emitting devices 36 are uniformly distributed in the circumferential direction of the rotor. The connecting lines between the inside ultrasonic wave emitting devices 36 and the outside ultrasonic wave emitting devices 36 represent ultrasonic wave channels, and the ultrasonic waves can propagate inward and outward, and alternatively, ultrasonic wave emitters can also be separately provided. The several ultrasonic transmitters 36 can emit ultrasonic waves more uniformly, to improve the infiltration and impregnation effects. Infiltration refers to the contacting of a liquid with a solid and spreading of the liquid on the solid, and the impregnation more emphasizes on the entering and penetrating of the liquid into the solid.

The impregnation process step in this solution is to inject the impregnation liquid into the sealed system with a certain degree of infiltration and impregnation (with the reinforcing material 242, the magnet steels 22, and the magnetic yoke 21) during the injection procedure, but the impregnation and infiltration procedures are performed mainly after the injection is finished, especially in the period that the vacuumizing is continued but the impregnation liquid no longer flows. The impregnation liquid infiltrates the reinforcing material 242, the magnet steels 22, and the magnetic yoke 21, and etc., to achieve full contact, and then performs further impregnation. In the duration of the entire impregnation process, the injection duration actually only takes up a small part. It can be seen that in the impregnation process, especially the main infiltration and impregnation stages, the wave energy input of the ultrasonic waves has a great significance on the sufficiency of infiltration and impregnation.

The rotor according to the above embodiments is an outer rotor, and the ultrasonic wave emitting device 36 at the outside of the rotor may have an inwardly concaved horn-shaped emitter, and the ultrasonic wave emitting device 36 at the inside of the rotor may have an outwardly convexed horn-shaped emitter, to respectively match an outer periphery and an inner periphery of the rotor, to emit ultrasonic waves with more uniform intensity. The several ultrasonic wave emitting devices 36 are rotatable, so that the ultrasonic waves may act more fully on the inner and outer surfaces of the rotor. In FIG. 9, the inner side ultrasonic wave emitting device 36 is provided with several ultrasonic wave emitting heads 361 towards the outer side of the vacuum bag 25, and an ultrasonic wave emitting chamber 362 is formed between the housing of the ultrasonic wave device 36 and the vacuum bag 25.

Specifically, the outside of the rotor is provided with an annular casing 300. As shown in FIG. 12, the annular casing 300 and the rotor form an annular cavity, and the ultrasonic wave emitting devices 36 at the outside of the rotor are arranged in the annular cavity and are mounted on the annular casing 300. The arrangement of the annular casing 300 facilitates the mounting and positioning of the outside ultrasonic wave emitting devices 36 and also facilitates the rotatable arrangement of the outside ultrasonic wave emitting devices 36. The entire magnetic pole of the rotor, the annular casing 300 and the ultrasonic wave emitting devices 36 can all be placed on an operating platform, and a base of the operating platform can be set to be rotatable.

The sealing and shielding cover 33 of the rotor mentioned above can shield microwaves and insulate heat when microwaves are used for heating. In the case that ultrasonic waves are used, the sealing and shielding thermal insulation cover 33 of the rotor can also shield the ultrasonic waves so as to avoid damages to fragile equipment (such as glass products) in the workshop possibly caused by the ultrasonic waves. The sealing and shielding thermal insulation cover 33 of the rotor covers the rotor and two ends of the annular cavity.

In impregnation, ultrasonic wave emission can also be controlled by frequency conversion, such as sinusoidal wave alternating control, to achieve a pulsating energy control. Similar to the principle of the above "variable pressure" control by the vacuumization, the mechanical wave action of ultrasonic waves with alternating high and low intensities on the impregnation liquid changes alternately between weak and strong, thereby facilitating fully filling of the impregnation liquid into the various clearances and gaps.

After the step of the injection of the impregnation liquid is completed, a curing procedure is started.

During the curing procedure, heating is required. As described above, the temperature of the resin is maintained at 30 degrees Celsius to 35 degrees Celsius during injection of the resin. At the curing stage, the temperature is generally maintained at 80 degrees Celsius to 120 degrees Celsius. Similarly to the heating desorption device described above, when heating at the curing stage, the far-infrared heating, the microwave heating device, and heating with the electric heating film 31 may also be employed, as shown in FIG. 9.

The curing procedure actually includes three temperature control stages, that is, a temperature increase stage, a constant temperature stage and a temperature decrease stage, and is a stagewise temperature control procedure. At the temperature increase stage, the temperature is increased from a resin injection temperature to a required curing temperature, as described above, the temperature is increased from a temperature ranging from 30 degrees Celsius to 35 degrees Celsius to a temperature ranging from 80 degrees Celsius to 120 degrees Celsius. After the temperature is increased to the required temperature, the constant temperature stage is carried out for a period of time, so as to facilitate reaction, gelation and curing of the curing agent and the resin. Finally, the temperature decrease stage is started. After the temperature decrease stage is carried out for a period of time, the vacuum pump 70 stops suctioning correspondingly. In this solution, the average suctioned gas volume flow of the vacuum pump 70 is gradually decreased, that is, a "sliding pressure control" is performed after curing, so as to prevent a sudden change in stress caused by sudden temperature decrease from affecting the service life of the protective layer 242'. The duration of the entire curing stage may be controlled to 7 hours to 8 hours.

For the curing process, a piezoelectric sensor may be provided to obtain the change of the thermal stress caused by the protective layer 242' on the surfaces of the magnet steels 22 and the pressing strips 26 during curing, thereby obtaining an optimum temperature increase speed (corresponding to the minimum thermal stress) which is suitable for the curing of the resin bonded to the reinforcing material 242. This requires two types of heat sources at the periphery of the rotor in FIG. 9, including a "flexible heat source", that is the electric heating film 31, located inside the heat insulation layer 32 at the outer wall of the magnetic yoke 21 of the rotor, and a heat source (the far-infrared heat source 34) at the inside of the magnetic yoke 21. The "flexible heat source" transmits the heat to the outside of the rotor in a manner of "heat conduction" by contacting the rotor. The heat source (far-infrared heat source 34) at the outside of the magnetic yoke 21 transmits the heat to the outer wall of the rotor by radiation (an electromagnetic wave). Therefore, irrespective of the manner in which the heat is given at the outside of the rotor, there is always an issue that whether the manner in which the heat is given at the outside of the rotor matches the far-infrared heat source 34 at the inside of the rotor. In an embodiment to address the issue, the temperatures at two sides of the protective layer 242' are consistent, that is, the temperatures detected by the temperature sensor 41 at the inner side of the vacuum bag 25 and the temperature sensor 43 on the surface of the magnet steel 22 are maintained consistent at the curing stage (7 hours to 8 hours) and in the procedure of temperature decreasing and slacking (5 hours to 6 hours). The temperature sensors 41, 43 are embodied as optical fiber sensors, to avoid being interfered by the microwaves. The temperature sensors 41, 43 not only transmit data to the controller of the entire system at the curing stage but also perform detection at other stages, so as to facilitate controlling the temperature changes in the desorption stage and the impregnation stage.

The principle of microwave heating is further described hereinafter to facilitate understanding the remarkable beneficial effects of using the microwave device in the process of this solution.

Using microwaves for heating, impregnation liquid absorbing microwave energy is the result of the interaction of polar molecules in the liquid with the microwave electromagnetic field. Under the action of an imposed alternating electromagnetic field, the polar molecules in the liquid material are polarized and have alternating orientations alternated along with the changes of polarities of the imposed alternating electromagnetic field. Frictional losses are caused when so many polar molecules alternate orientations frequently (approximately 10 times per second), which converts electromagnetic energy into thermal energy. According to Debye theory, the relaxation time r of polar molecules in the polarization and relaxation process is related to the circular frequency m by which the polarity of the imposed alternating electromagnetic field changes, and there is a result of $\omega\tau=1$ in the microwave frequency band. Calculated with the two microwave operating frequencies of 915 MHz and 2450 MHz commonly used in China's industrial microwave heating equipment, it is obtained that the order of magnitudes of r is about $10^{-11}$ to $10^{-10}$ s, therefore, the procedure that the microwave energy is converted into thermal energy in the material has an instantaneous nature.

The instantaneous nature of microwave heating brings the following features to microwave heating:

(1) Material heating is inertialess, i.e., as long as there is microwave radiation, the material may just be heated instantly, and reversely, when there is no microwave radiation, the material will not receive microwave energy and is not heated. The property of allowing the material to instantaneously obtain or lose the source of heating power (energy) meets the heating requirements of industrial continuous automated production. Specifically, as for this solution, the instantaneousness of heating is conducive to the carrying out of desorption, preheating, impregnation, and curing.

(2) It is not necessary to preheat a heating medium or a heating equipment and the like in the heating procedure, thereby avoiding extra energy consumption caused by preheating.

(3) In this embodiment, the magnetic yoke 21 and the magnet steels 22 forming the sealed system are each made of a metal material, so that the loss of power caused by the cavity wall absorbing microwaves only takes up an extremely small part of the total consumed power. Therefore, the most majority of energy of microwaves entering the sealed system is absorbed and consumed by the filling medium, thus forming a heating feature of high energy utilization rate that the consumed energy is concentrated on the material to be heated. The microwave curing is different from the traditional thermal curing with the conduction heating method in which thermal is conducted from the exterior to the interior. In the microwave curing, the polarized medium directly converts the microwave energy into the thermal energy of the material due to the dielectric loss in the electromagnetic field, thereby accelerating the reaction to make the composite material quickly cured, which is beneficial to the curing of the protective layer 242'.

The energy absorbed by the composite material under microwave irradiation can be expressed as:

$$P=2\pi f \varepsilon_0 \varepsilon''(T)E^2;$$

in the equation, f indicates a microwave radiation frequency (Hz);

E indicates an electric field strength (V/m);

$\varepsilon_0$ indicates the permittivity of free space ($8.854\times10^{-12}$ F/m);

$\varepsilon''$ (T) indicates a dielectric loss factor.

As can be seen from the above equation, the greater the dielectric loss factor, the higher the microwave absorption capability. It can be seen that the method of microwave heating is different from the heat radiation heating method and the heat conduction heating method. When microwave heating is used to heat the resin, the interior of the resin may be heated more uniformly, which facilitates preheating the impregnation liquid.

After the protective layer 242' is formed through desorption, impregnation and curing, wave energy may be input into the protective layer 242' by the ultrasonic wave emitting device 36, and "cavitation" may be implemented to the protective layer 242', to break the holes qp formed due to the gas remained in the protective layer 242' and the bubbles carried by the resin, thereby reducing the residual amount of the bubbles.

Specifically, the positions of the holes qp in the protective layer 242' can be acquired by the ultrasonic wave emitting devices 36, and ultrasonic waves are emitted to the surface of the protective layer 242' at positions corresponding to holes qp, to break the shallow part of the protective layer 242' at the positions corresponding to the holes qp, and anti-corrosion coating treatment is performed to the broken positions, for example, coating an anti-corrosion paint. This step is the last remedy. After the treatment in the above steps, if holes qp may still remained in the protective layer 242', the holes qp on the surface in the shallow part of the protective layer can be broken, to reduce the holes qp as far as possible, and other portions of the protective layer corresponding to the holes qp deeper than the shallow part are not treated, to avoid adversely affecting the stability of the entire protective layer 242'. The holes qp in the shallow part here refer to the holes qp in the surface layer of the protective layer 242'.

Further, a size threshold for the holes qp and/or a density threshold of distribution of the holes qp can be preset, and when an acquired actual size of a hole qp exceeds the size threshold and/or an actual density of distribution exceeds the density threshold, breaking treatment is performed. That is, for the holes qp in the shallow part, braking treatment is performed only to those regions with holes qp distributed in a high density or having large sizes. Since when the holes qp are small or if their distribution density is low, they are not apt to induce extension fractures. In this case, not performing breaking treatment can avoid increasing the ultrasonic power for breaking the very small holes qp that may cause new unexpected recessive fractures inside the material.

Specifically, when performing the ultrasonic breaking treatment, the distribution diagram of positions of all the holes qp in the protective layer 242' can be acquired first, i.e., the three-dimensional distribution, including the circumferential positions, heights, depths, and after the distribution diagram is obtained, the ultrasonic wave emitting device 36 then determines whether to perform the breaking operation according to the distribution positions of the holes qp and requirements, and then performs the breaking operation sequentially. Compared with the manner of breaking while detecting, this breaking method makes the breaking operation more efficient.

Before performing the anti-corrosion coating treatment to the broken portions, temperature rising treatment can be performed to the protective layer 242' firstly. The temperature rising treatment facilitates the vaporization and separation of the moisture on the surface of the protective layer 242', to ensure a stable performance of the anti-corrosion coating after the anti-corrosion coating treatment is applied. The specific temperature after the temperature rising treatment can be higher than the environment temperature by 10 degrees Celsius, or while performing the temperature rising treatment, a dehumidification treatment is performed to a surface adsorbed air layer adsorbed to the surface of the protective layer 242'. The surface adsorbed air layer may be an air layer having a thickness of about 2 mm on the surface of the protective layer 242'. When the environment temperature is high, the single temperature rising treatment may have a poor effect on moist air vaporization, therefore, a special dehumidification process may be performed together, to ensure that the humidity meets the requirements, for example, the humidity can be reduced to 20%.

Before the anti-corrosion coating treatment is performed to the broken portions, a vacuum debubbling process may be performed to the anti-corrosion material, the vacuum debubbling treatment is similar to the debubbling treatment for the impregnation liquid performed in the resin system tank, and is to make the anti-corrosion material have no bubbles as far as possible before the coating. Further, the temperature of the anti-corrosion material is risen to be substantially the same as the temperature of the protective layer 242', to allow the anti-corrosion material to be better adhered to the protective layer 242'.

In each of the above embodiments, description is made by taking the magnetic yoke 21 of the outer rotor as an example. In the case that the rotor is designed as an inner rotor, it simply requires to make a radial exchange correspondingly. For example, in the case of the inner rotor, the protective layer 242' is formed at the outer wall of the magnetic yoke 21, and the vacuum bag 25 and the like are provided at the outer wall of the magnetic yoke 21.

In the above embodiment, the following steps are performed in sequence including desorption to the sealed system, injecting the impregnation liquid into the sealed system to infiltrate and impregnate with the impregnation liquid, curing the impregnation liquid to form the protective layer 242', and heating treatment is performed in each of the three steps, and the heating treatment includes microwave heating, far-infrared heating and heating with the electric heating film 31. It can be known that, at the stage of the desorption process, heating facilitates desorption of gas; at the stage of impregnation process, the solid is heated, which facilitates the impregnation and infiltration of liquid; and at the stage of curing process, heating can improve the curing effect. It should be noted that the preferred solution is to perform heating in each of the steps of desorption, impregnation and curing. Of course, performing heating in only one or two steps can also achieve a certain technical effect. In addition, performing ultrasonic vibration in at least one of impregnation and desorption processes may facilitate the impregnation and infiltration of liquid and desorption of gas, and the ultimate object is to reduce the generation of bubbles, to allow the positions of the holes qp in the protective layer 242' formed finally to be reduced.

The above embodiments are only preferred embodiments of the present application. It should be noted that, for the person skilled in the art, a few of improvements and modifications may be further made without departing from the principle of the present application, and these improvements and modifications should also be deemed to fall into the scope of protection of the present application.

The invention claimed is:

1. A flexible molding system for a magnetic pole protective layer, comprising:
   a magnetic yoke;
   magnet steels mounted at respective positions on a side wall surface of the magnetic yoke;
   a reinforcing material and a vacuum bag laid on the magnet steels and the side wall surface of the magnetic yoke, wherein the vacuum bag, the side wall surface of the magnetic yoke, and the magnet steels form a sealed system; and
   one or more ultrasonic wave emitting devices configured to emit ultrasonic waves to the sealed system while an impregnation liquid is injected into the sealed system to infiltrate and impregnate, wherein the one or more ultrasonic wave emitting devices comprise at least a first ultrasonic wave emitting device inside the magnetic yoke.

2. The flexible molding system for the magnetic pole protective layer according to claim 1, wherein an annular casing is provided outside the magnetic yoke, the annular casing and the magnetic yoke form an annular cavity, the one or more ultrasonic wave emitting devices further comprise a second ultrasonic wave emitting device outside the magnetic yoke, and the second ultrasonic wave emitting device is arranged in the annular cavity and mounted to the annular casing.

3. The flexible molding system for the magnetic pole protective layer according to claim 2, further comprising a sealing and shielding thermal insulation cover that covers the magnetic yoke and two ends of the annular cavity.

4. The flexible molding system for the magnetic pole protective layer according to claim 1, further comprising:
   a heating device, comprising at least one of a microwave device, a far infrared heat source, or a thermally conductive heating device,
   wherein the microwave device comprises a radiant heater configured to provide microwaves, and an inner surface of the radiant heater facing the sealed system is provided with a wave absorbing material.

5. The flexible molding system for the magnetic pole protective layer according to claim 4, wherein the radiant heater has a horn type housing, and the wave absorbing material is provided on an inner side surface of the horn type housing.

6. The flexible molding system for the magnetic pole protective layer according to claim 4, wherein the thermally conductive heating device comprises an electric heating film, and the electric heating film is placed on an outer side of the magnetic yoke.

7. The flexible molding system for the magnetic pole protective layer according to claim 6, wherein a heat insulation layer is applied at an outer side of the electric heating film on the wall surface of the magnetic yoke.

8. The flexible molding system for the magnetic pole protective layer according to claim 1, further comprising a microwave preheating device arranged between a system tank for carrying the impregnation liquid and the sealed system, the microwave preheating device being configured to perform microwave heating to the impregnation liquid before the impregnation liquid is inputted into the sealed system.

9. The flexible molding system for the magnetic pole protective layer according to claim 8, wherein:
   the microwave preheating device is provided with a resin chamber, and microwaves generated by the microwave preheating device are inputted into the resin chamber;
   the impregnation liquid in the system tank is configured to enter the resin chamber to be heated; and
   a non-metallic screen plate is provided inside the resin chamber, the non-metallic screen plate is provided with a plurality of screen openings, and the impregnation liquid is configured to pass through the plurality of screen openings to be heated by the microwaves generated by the microwave preheating device.

10. The flexible molding system for the magnetic pole protective layer according to claim 9, further comprising:
    a first manifold, wherein the resin chamber is in communication with the first manifold, the first manifold is provided with a plurality of outlets in communication with the sealed system, and a corresponding regulating valve is provided between the sealed system and each of the plurality of outlets of the first manifold.

11. The flexible molding system for the magnetic pole protective layer according to claim 9, further comprising a second manifold, wherein the microwave preheating device has a plurality of resin chambers, outlets of the plurality of resin chambers are respectively in communication with a plurality of inlets of the sealed system, inlets of the plurality of resin chambers are respectively in communication with outlets of the second manifold, and an inlet of the second manifold is in communication with the system tank.

12. The flexible molding system for the magnetic pole protective layer according to claim 1, further comprising a system tank configured to carry the impregnation liquid, wherein the system tank comprises:
    a stirrer configured to stir the impregnation liquid;
    a resin stirring tank; and
    a resin output tank,
    wherein the resin stirring tank and the resin output tank are in communication with each other, the resin stirring tank is located at upstream of the resin output tank, the stirrer is arranged in the resin stirring tank, and an ultrasonic debubbling vibrating bar is further provided in the resin output tank.

13. The flexible molding system for the magnetic pole protective layer according to claim 12, wherein the resin stirring tank is provided with a first air outlet, the resin output tank is provided with a second air outlet, the first air outlet is in communication with a vacuum pump, and the second air outlet is in communication with the vacuum pump or the atmosphere.

14. The flexible molding system for the magnetic pole protective layer according to claim 12, wherein:
    a heating resistor is provided in the stirrer to heat the impregnation liquid while the impregnation liquid is stirred; and
    the stirrer is driven by an electric motor, the electric motor is provided with a hollow shaft, a stirring blade of the stirrer is provided at a bottom end of the hollow shaft, extension wires of a winding of the electric motor extend along the hollow shaft and form an electric circuit, and the extension wires are configured to supply power to the heating resistance.

15. The flexible molding system for the magnetic pole protective layer according to claim 12, wherein the stirrer is driven by an electric motor, the electric motor is provided with a hollow shaft, a stirring blade of the stirrer is provided at a bottom end of the hollow shaft, and an ultrasonic high-frequency vibration emission head is further provided at a bottom portion of the hollow shaft.

16. The flexible molding system for the magnetic pole protective layer according to claim 1, wherein the one or more ultrasonic wave emitting devices further comprise a plurality of second ultrasonic wave emitting devices uniformly distributed outside the magnetic yoke.

17. The flexible molding system for the magnetic pole protective layer according to claim 16, wherein each of the plurality of second ultrasonic wave emitting devices outside the magnetic yoke has an inwardly concaved horn-shaped emitter, and the first ultrasonic wave emitting device inside the magnetic yoke has an outwardly convexed horn-shaped emitter.

18. The flexible molding system for the magnetic pole protective layer according to claim 16, wherein the first ultrasonic wave emitting device and the plurality of second ultrasonic wave emitting devices are rotatable.

19. The flexible molding system for the magnetic pole protective layer according to claim 1, further comprising a temperature sensor configured to detect a temperature of the sealed system.

20. The flexible molding system for the magnetic pole protective layer according to claim 19, wherein the temperature sensor comprises an optical fiber sensor.

* * * * *